No. 854,632. PATENTED MAY 21, 1907.
T. B. CRIDDLE.
HOE SHARPENING DEVICE.
APPLICATION FILED JULY 14, 1906.
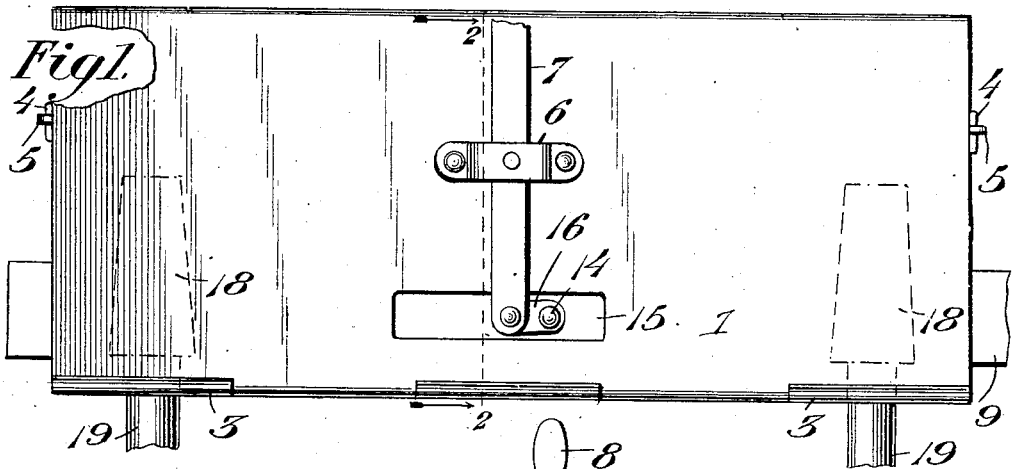
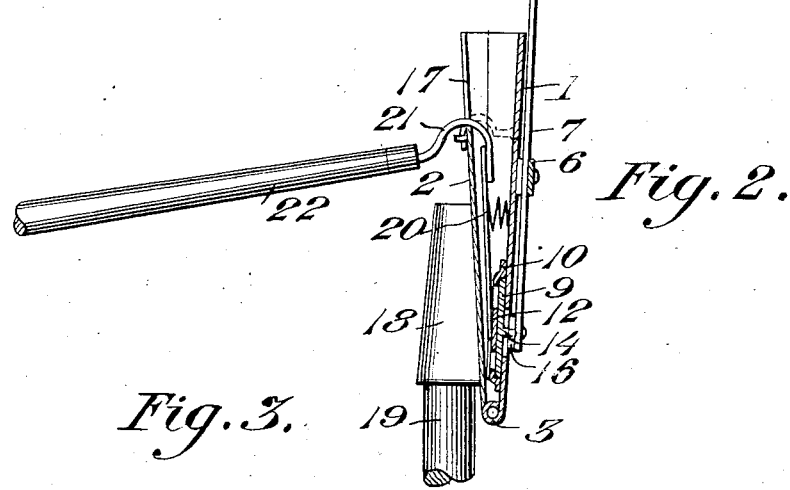
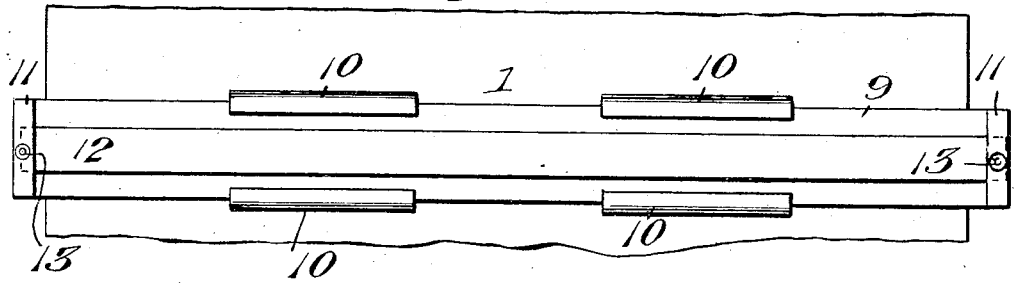
Witnesses
Phil E. Barnus
Aimee L. Brown
Inventor
T. B. Criddle.
By Victor J. Evans
Attorney

UNITED STATES PATENT OFFICE.

THOMAS B. CRIDDLE, OF WAXAHACHIE, TEXAS.

HOE-SHARPENING DEVICE.

No. 854,632.  Specification of Letters Patent.  Patented May 21, 1907.

Application filed July 14, 1906. Serial No. 326,235.

*To all whom it may concern:*

Be it known that I, THOMAS B. CRIDDLE, a citizen of the United States, residing at Waxahachie, in the county of Ellis and State of Texas, have invented new and useful Improvements in Hoe-Sharpening Devices, of which the following is a specification.

This invention relates to a mechanical device for sharpening the blades of hoes such as are used for chopping out cotton and for other agricultural purposes.

The blades of hoes, after a period of use, become dull and blunt, thus destroying the efficiency of the hoe. It has been customary to sharpen the edges by means of a file operated by hand, but this operation has been slow and laborious, and the result has usually been far from satisfactory owing partly to the difficulty of maintaining the hoe steadily in position while being operated upon, and partly to the difficulty of imparting to the edge exactly the proper slant.

The object of the present invention is to overcome this difficulty by providing a simple and efficient and practical device including a holder for the hoe blade, a reciprocatory file-carrier, and means for operating the latter; further objects of the invention being to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention, may be resorted to when desired.

In the drawings,—Figure 1 is a side elevation of a hoe-sharpening device constructed in accorance with the principles of the invention. Fig. 2 is a vertical transverse sectional view taken on the plane indicated by the line 2—2 of Fig. 1. Fig. 3 is a detail view, in elevation, of the inner side of a portion of one of the leaves of the device, showing the file carrier.

Corresponding parts in the several figures are indicated by like characters of reference.

The improved device includes two side members or leaves 1 and 2, which are connected by means of hinges 3 along their lower edges. The upper edges of the leaves 1, 2 are spaced apart, and the leaves are connected by means, such as hooks 4, connected with one of the leaves and engaging eyes 5 upon the outer leaf, said hooks and eyes being preferably disposed at the ends of the leaves; other suitable and well known means may, however, be employed, within the scope of the invention, for connecting and spacing the leaves apart along their upper edges.

Upon one of the leaves 1 there is secured a keeper 6 in which is fulcrumed a hand lever 7 provided at its upper end with a handle 8. This lever is for the purpose of operating the reciprocatory file-carrying device which consists of a slide 9, mounted in guides or ways 10 upon the inner side of the leaf 1, so as to be capable of transverse reciprocatory movement. The slide or file carrier 9 is provided at the ends thereof with flanges 11, for the reception of the ends of a file 12, which latter may be secured in position, adjustably, as by means of set screws 13, enabling said file to be adjusted vertically and to be firmly secured at various adjustments; this feature is important, inasmuch as by providing for the vertical adjustment of the file the entire face of the latter may be utilized, a slight change of position being sufficient to displace a worn portion and to substitute a fresh portion to the face in position for operation. It is also obvious that when one side of the file blade is worn out, the blade will be turned over and the opposite face exposed in position for operation.

The rear side or face of the file carrier or slide 9 has a pin or stud 14 which extends through a slot 15 in the leaf 1; said pin or stud being connected, as by a link 16, with the lower end of the hand lever 7, which may thus be utilized to impart a reciprocatory movement to the slide. The link 16 may be dispensed with, and the lever 7 may be directly connected with a pin 14 by simply forming in the lever a slot for the passage of said pin, as will be readily understood.

The leaf 2 of the device is provided at its upper edge with a notch 17, for the reception of the shank of the hoe that is to be operated upon; the leaf 2 is also shown as being provided with sockets 18, for the reception of legs 19, whereby the device may be supported in position for operation.

In Fig. 2 of the drawings has been shown a hoe, the blade 20 of which is inserted between the leaves 1, 2, of the device; the shank 21 being accommodated in the notch 17 while the handle 22 extends outwardly of the device. Springs, as 23, may be connected with the leaf 1 to bear against the hoe blade for the purpose of holding the latter securely in position to be operated upon, thus dispensing with the necessity of manually holding the hoe while the blade is being sharpened.

It is obvious that the proportions of the improved device are so calculated that when a hole is placed in position for operation the lower edge of the blade shall be engaged by the file; the leaves 1, 2, being held by the connecting hooks at such an angle with relation to each other that the file will be supported at precisely the proper slant with relation to the hoe blade. It is obvious that a file blade will be used of sufficient width to engage the edges of hoes of slightly varying dimensions, the variation in the dimensions of the hoes being caused by gradual wear or any other reasons. Vertical adjustment of the file blade may also be effected, so that the file blade shall properly engage the edge of the hoe. The hoe blade having been placed properly in position, the hand lever 7 is manipulated to reciprocate the file carrier, thus causing the file to abrade and sharpen the edge of the hoe, speedily, and more efficiently and accurately than it could be done by hand.

This improved hoe-sharpening device is extremely simple, and it may be manufactured and marketed at an expense sufficiently low to enable its acquisition by individual farmers; thus enabling these necessary tools to be sharpened at home and without having recourse to skilled labor.

What is claimed is:—

1. In a hoe sharpening device, a pair of leaves spaced apart at their upper edges, and a file-carrying member supported for reciprocation upon the inner face of one of the leaves.

2. A hoe sharpening device including a pair of leaves connected together at their lower edges and spaced apart at their upper edges, a file-carrying member supported for reciprocation upon the inner face of one of the leaves, and means for operating said file-carrying member.

3. A hoe sharpening device including a pair of leaves hingedly connected along their lower edges and spaced apart at their upper edges, a file carrying member supported for reciprocation upon the inner face of one of the leaves, a file adjustably connected to said member, and means for operating the latter.

4. A hoe sharpening device including a pair of leaves connected together along their lower edges and spaced apart at their upper edges, a file-carrying member supported for reciprocation in ways upon the inner face of one of the leaves and having flanges at the ends thereof, a file blade supported for vertical adjustment with said flanges, a pin extending from the file-carrying member through a slot in the leaf upon which it is mounted, and an operating lever pivotally supported upon said leaf and suitably connected with the pin of the file-carrying member.

5. A hoe sharpening device including a pair of leaves hingedly connected along their lower edges, means for spacing and separating the upper edges of said leaves, a file-carrying member supported for reciprocation upon the inner face of one of the leaves, and hoe-blade supporting springs connected with one of the leaves.

6. A hoe sharpening device including a pair of leaves supported at an angle with one another one of said leaves having a hoe-shank receiving notch, a reciprocatory file carrier, and springs adapted to support a hoe blade in position to be operated upon.

In testimony whereof, I affix my signature in presence of two witnesses.

THOMAS B. CRIDDLE.

Witnesses:
GEO. L. GRIFFIN,
E. D. CRIDDLE.